United States Patent

Ikoma et al.

[11] 4,355,401
[45] Oct. 19, 1982

[54] RADIO TRANSMITTER/RECEIVER FOR DIGITAL AND ANALOG COMMUNICATIONS SYSTEM

[75] Inventors: Masao Ikoma; Noboru Saegusa; Yoshihiko Akaiwa; Ichirou Takase, all of Tokyo, Japan

[73] Assignee: Nippon Electric Co., Ltd., Tokyo, Japan

[21] Appl. No.: 191,154

[22] Filed: Sep. 26, 1980

[30] Foreign Application Priority Data

Sep. 28, 1979 [JP] Japan ................................ 54-124951

[51] Int. Cl.³ ............................................ H04M 1/70
[52] U.S. Cl. ........................................ 375/5; 375/2.1; 375/8; 455/26; 455/78
[58] Field of Search .............. 179/1.5 R, 1.5 E, 2 DP, 179/6 R, 3; 340/170, 171 R; 375/2.1, 2.2, 3, 4, 5, 46, 7, 8; 455/26, 31, 38, 7, 73, 78

[56] References Cited

U.S. PATENT DOCUMENTS

3,939,431  2/1976  Cohlman ................................ 375/5
4,167,700  9/1979  Coe et al. ............................ 455/26

OTHER PUBLICATIONS

Recommendations and Reports of the CCIR, 1978, International Telecommunication Union, pp. 242-243.

*Primary Examiner*—Benedict V. Safourek
*Attorney, Agent, or Firm*—Laff, Whitesel, Conte & Saret

[57] ABSTRACT

According to the present invention, a radio apparatus has a section for receiving an analog signal and a digital angle-modulated carrier wave signal. The analog signal and digital angle-modulated carrier wave output of the receiver section are demodulated to provide first and second demodulated signals. A clock signal is regenerated from the output of either the demodulating means or receiver section. A control signal selectively operates a switch for passing either the first or the second demodulated signals. The regenerated clock signal controls the switch.

5 Claims, 3 Drawing Figures

RADIO TRANSMITTER/RECEIVER FOR DIGITAL AND ANALOG COMMUNICATIONS SYSTEM

The present invention relates to a radio transmitter/receiver and, more particularly to a radio transmitter/receiver for both analog and digital angle-modulated carrier waves.

Portable radio transmitter/receivers for business or commercial use often use either analog frequency modulation (FM) or analog phase modulation (PM) systems in which an audio or tone signal angle-modulates a carrier wave. The analog angle modulation system is highly suitable for use in a compact form and under stringent electric field conditions, as for instance in mobile radio communication. However, an analog angle modulation system has a disadvantage of being highly susceptible to call interception. Some secret communication systems have been proposed, but none has yet has been proposed for use in any analog system which is both compact and lightweight, and which provides high speech quality without allowing ready call interception.

On the other hand, it is easy to maintain secrecy in digital angle modulation communication systems, in which an analog signal is converted into a digital code. The converted digital code angle-modulates a carrier wave to be transmitted. Such transmission can keep the secret communication secure from parties having different code or conventional analog angle modulation receivers by changing the sequence of digital code in accordance with a specified code. Further, such a system provides a high speech quality. Well known among these digital angle modulation systems are phase shift keying (PSK) and frequency shift keying (FSK) systems. The PSK modulation system is an excellent system for the transmission of a large quantity of information per unit of frequency band and for requiring no large signal-to-noise power ratio in order to reduce the error rate to a given level. The FSK modulation system can cause class C amplifiers, or the like, to act nonlinearly because such an amplifier has a constant amplitude component. It is also superior in power efficiency and can be effectively used for apparatus with small battery capacities, such as mobile communication units.

The current standard of channel allocation for mobile communication on land is such that a party using the F3 type system (designated by CCIR), for example, is allocated 25 KHz per channel. In such a system, analog angle modulation transmitter-receivers operate in conformity with this standard. To promote an extensive use of digital modulation system, which has the aforementioned secret communication capability and also excellent interference characteristics among other advantages, it is desirable for effective frequency utilization to allocate a channel within a 25-KHz band. In other words, it is more advantageous to use both analog and digital modulation systems within a common band in such a combination to effectively utilize the advantageous characteristics of each system.

An object of the present invention, therefore, is to provide a receiver which is capable of receiving both analog and digital angle-modulated signals, automatically distinguishing them from each other, and accordingly selecting the appropriate demodulating circuit. Another object is to provide an apparatus comprising a receiver and a transmitter capable of automatically selecting a modulator for either analog or digital signals, depending upon the signals distinguished by the receiver in accordance, with the receive modulation system distinguished by the receiver.

According to the present invention, a radio apparatus includes a receiver section for receiving analog and digital angle-modulated carrier waves. The output of the receiver section is connected to a demodulator for respectively demodulating the analog and digital angle-modulated carrier wave in order to provide a first and second demondulated signal. A clock signal is regenerated from the output of either the demodulator or receiver section. A control signal selectively operates a first switch for passing either of the first and second demodulated signals. The clock signal controls a generation of the control signal.

Other features and advantages of the invention will be more apparent from the following detailed description taken in conjunction with the accompanying drawings, wherein.

Figure 1:
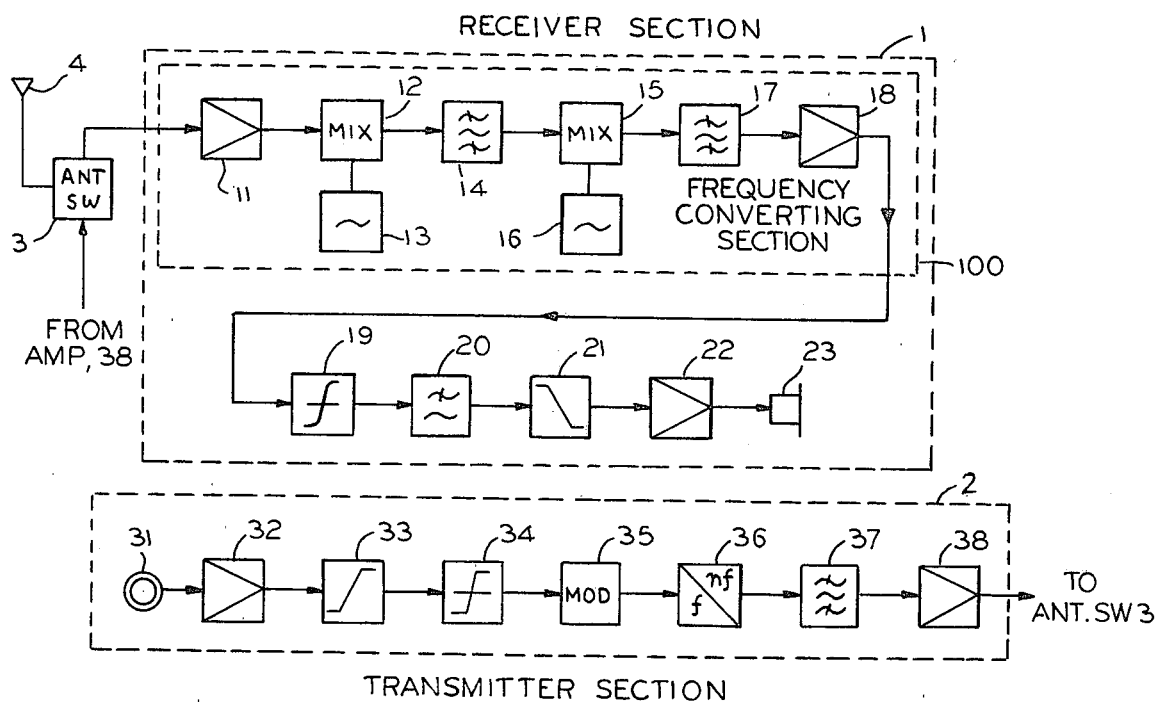
FIG. 1 is a block diagram illustrating a conventional analog FM transmitter/receiver.

FIG. 1, includes a receiver section 1; a transmitter section 2; and a frequency converting section 100. The transmitter and receiver sections are connected by way of an antenna switch 3 to an antenna 4. An FM signal received at the antenna 4, is amplified by a high frequency amplifier 11, and frequency-converted by a first mixer 12. After only the desired frequency is selected by a band-pass filter 14, the selected signal is further frequency-converted by a second mixer 15, band-restricted by a band-pass filter 17, and sufficiently amplified by an intermediate-frequency (IF) amplifier 18. First and second local oscillators, 13 and 16 respectively, have outputs which are fed to the mixers 12 and 15. An input FM signal is amplified and amplitude-restricted by the IF amplifier 18 is demodulated by a frequency discriminator 19, to provide a demodulated audio signal to be delivered from a speaker 23 as audible sounds. A low-pass filter 20, integrator 21 and amplifier 22 are interposed between discriminator 19 and speaker 23.

In the transmitter section 2, an audio or tone signal is applied to an FM modulator 35 by way of a microphone 31, amplifier 32, differentiation circuit 33 and limiter 34. This signal is FM-modulated by modulator 35 there. The modulated signal then passes through a frequency multiplier 36 and band-pass filter 37 after which it is amplified by a high frequency amplifier 38, to a required transmission power level. The integrator 21 of the receiver section 1 and the differentiation circuit 33 of the transmitter section 2, each constitute an emphasis circuit.

This analog FM transmitter/receiver, illustrated in FIG. 1, is unable to demodulate a digital FM (or angle-modulated) wave, which has various advantages, and effectively prevents unauthorized call interception.

Figure 2:
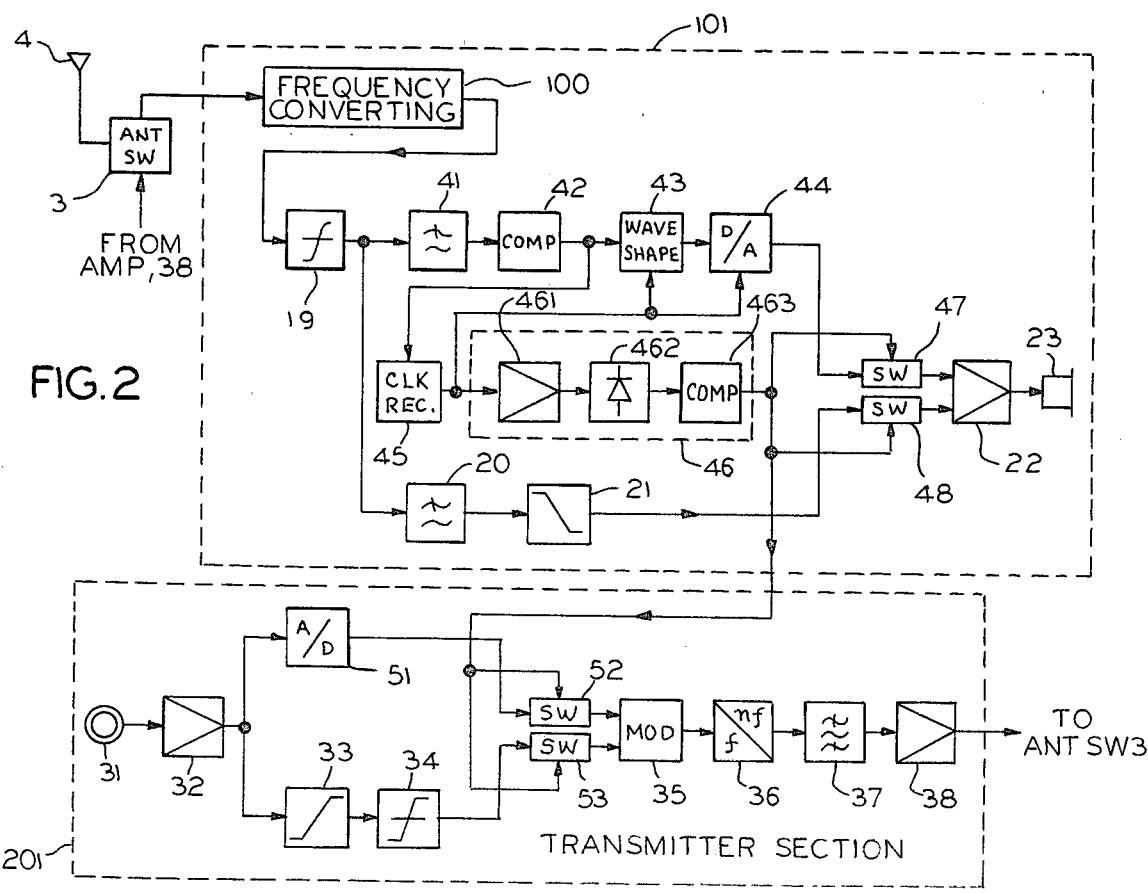
FIG. 2 is a block diagram illustrating a transmitter/receiver which is one embodiment of the present invention.

FIG. 2 is a block diagram illustrating a preferred composition of a radio transmitter/receiver, in accordance with the present invention. Receiver and transmitter sections 101, 201 correspond to the receiver section 1 and transmitter section 2 of FIG. 1. Components are identified in FIG. 2 by the same numerals that are used in FIG. 1, and they have the same functions as the respectively corresponding ones in FIG. 1. In the receiver section 101, the input signal is frequency-converted and amplified in the same manner as in the frequency converting section 100 of FIG. 1. Then, the resulting signal is demodulated into a baseband signal by a frequency discriminator 19. The demodulated baseband signal is led into two low-pass filters 20 and 41.

Suppose now that the input signal is a digital FM wave. The baseband signal is band-restricted by the low-pass filter 41, and then is converted into digital signal having a logic level of either a "1" or "0". Conversion is made by a level decision circuit 42, whose output is fed to a clock recovering circuit 45. At the same time, the output of the level decision circuit 42 is also supplied to a wave shaping circuit 43, where it undergoes wave shaping at the timing of the regenerated clock signal from the clock recovering circuit 45. The wave-shaped signal is converted into an analog signal by a digital/analog (D/A) converter 44, with reference to the timing of the regenerated clock signal. The clock recovering circuit 45 may include, for instance, a timing recovering circuit like the one described in the paper entitled Floyd M. Gardner, "Phaselock Techniques," John Wiley & Sons, Inc., 1966, pp. 117-119.

An analog/digital (A/D) decision circuit 46, in response to the output of the clock recovering circuit 45, decides whether the received signal is an analog or a digital FM wave. The output signal of the clock recovering circuit 45 is regular signal having a logic level of "1" and "0" alternating in a fixed cycle when the input signal is digital FM wave. It is an irregular signal having "1" and "0" when the input signal is an analog FM wave. Therefore, if the output of the clock recovering circuit 45 is rectified by a rectifying circuit 462 after being amplified by an amplifier 461, there will arise a difference in the D.C. component of the rectified signal, depending on whether the input signal is an analog modulated wave or a digital modulated wave. This D.C. component is subjected to discrimination by a voltage comparator 463, to determine the modulation system of the input signal. When the input signal is a digital FM wave, the deciding circuit 46 turns switches 47 and 52 and turns off switches 48 and 53. Whereas, when the input signal is an analog FM wave, deciding circuit turns on switches 48 and 53 and turns off switches 47 and 52.

When the input signal is a digital FM wave, the switch 47 is turned on and the switch 48 is turned off. Then, the output of the D/A converter 44 is supplied to an amplifier 22 to be delivered from a speaker 23 as reproduced signal. On the other hand, when the input signal is an analog FM wave, the demodulated analog signal obtained from the frequency discriminator 19 through the low-pass filter 20 and an integrator 21 is delivered as sound eminating from the speaker 23, after having gone through the switch 48 and the amplifier 22.

Reference numeral 201 in FIG. 2 identifies a radio transmitter section, wherein components bearing the same reference numerals that are used in the transmitter section 2 of FIG. 1, respectively, have the same functions as the corresponding components. An audio or tone signal picked up by a microphone 31, pass through an amplifier 32, to an analog/digital (A/D) converter 51, where they are converted into a digital code. An example of the analog to digital converter 51 is disclosed in the U.S. Pat. No. 4,164,733 entitled "Quantized Feedback Analog to Digital Converter with Offset Voltage Compensation," and issued on Aug. 14, 1979 to Landsburg, et al. The output of the amplifier 32 is also limited in amplitude by a limiter 34, after being differentiated by a differentiation circuit 33. Thereupon, the switch 52 or 53 is selected and turned on by the output of the A/D decision circuit 46 of the receiver section 101 as described above. If the switch 52 is turned on, the output of the A/D converter 51 is transmitted as a digital FM wave. Or, if the switch 53 is turned on, the output of the limiter 34 is transmitted as an analog FM wave. Either way the signal passes through frequency divider 36, band-pass filter 37, amplifier 38, and an antenna 4.

As hitherto described, the present invention enables a conventional analog FM transmitter/receiver to transmit and receive a digital FM wave. It is merely necessary to add to the conventional transmitter/receiver digital signal decoding circuit, an analog signal coding circuit and an A/D decision circuit. In addition, the transmitter/receiver, according to the present invention, can automatically select either its analog or its digital receiving sections. The transmitting section corresponding to the receiving section can also be automatically selected.

Figure 3:
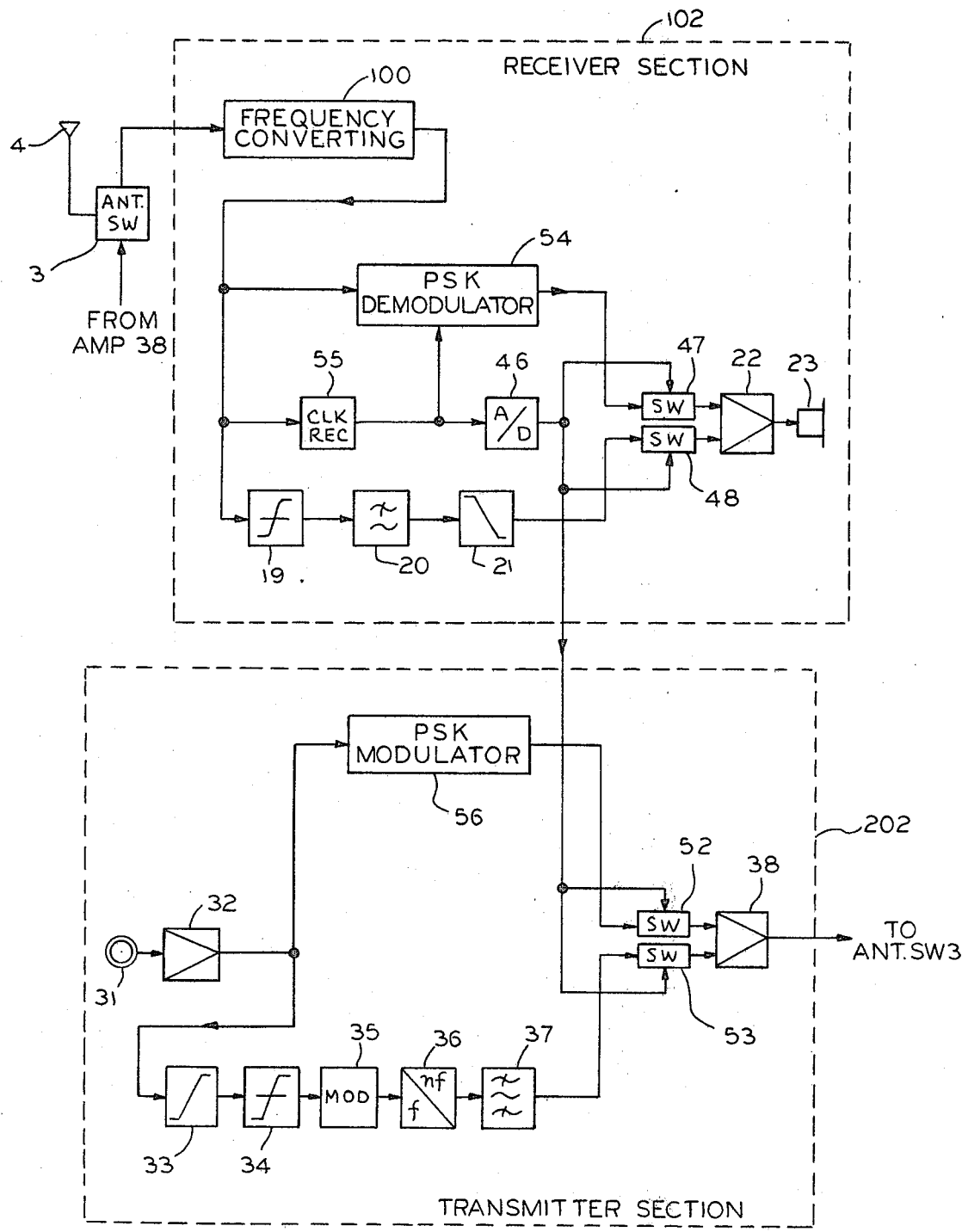
FIG. 3 is a block diagram illustrating another embodiment of the present invention.

Although the foregoing description merely referred to a digital FM wave, the present invention enables a transmission/reception of PSK modulated wave too, if the equipment used has a comparatively large battery capacity. Thus, as illustrated in FIG. 3, a PSK modulated wave is demodulated by supplying the output of the frequency converting circuit 100 to a PSK demodulator 54. As PSK demodulator 54, the pertinent elements disclosed in U.S. Pat. No. 3,878,475 can be used. The clock signal is regenerated from the output of the frequency converting circuit 100 by means of a clock recovering circuit, like the one illustrated in FIG. 1 of Charles R. Hogge, Jr., "Carrier and Clock Recovery for 8 PSK Synchronous Demodulation," IEE, National Communications Conference, 1977. The recovered clock signal is supplied to the PSK demodulator 54 and A/D decision circuit 46. An analog FM wave is demodulated in the same manner as illustrated in FIG. 2. In the transmitter section 202, an audio or tone signal, to be transmitted, is derived from the output of the amplifier 32, and is either turned into a PSK modulated wave by a PSK modulator 56 (see, for instance, U.S. Pat. No. 4,168,397) or entered into the differentiation circuit 33 side to become an analog FM wave. This PSK modulated or analog FM wave selectively passes the switch 52 or 53 and is transmitted from the antenna 4.

The switches 52 and 53 of the transmitter sections 201 and 202 of FIGS. 2 and 3 can, as well, be inserted into the input side of the A/D converter 51 or PSK demodulator 56 and that of the differentiation circuit 33, respectively. It can also be readily inferred that, although the receiver section 101 or 102 and transmitter section 201 or 202 are integrated in these embodiments, the receiver section 101 or 102 can be isolated from the transmitter section 201 or 202 and used exclusively for reception, as required.

What is claimed is:

1. A method of securely encoding communication, the method comprising the steps of:
   (a) converting an analog signal into a digitally encoded signal,
   (b) selecting between said analog signal and digitally encoded signal for transmission in response to a control signal, (c) angle modulating a carrier wave with the selected analog signal or digitally encoded signal, (d) transmitting the angle modulated carrier wave, (e) receiving and demodulating said angle modulated carrier wave to produce one of either the analog or the digitally encoded signals, (f) regenerating a clock signal responsive to the received signal of step (e), (g) generating said control signal responsive to said clock signal of step (f), (h) decoding said encoded signal of step (e) to produce an analog signal, (i) selecting said analog signals of either steps (e) or (h) in response to said control signal.

2. The process of claim 1 wherein said transmission of step (d) is in the 25 KHz band.

3. A radio device having secure transmission capabilities, said device comprising means for transmitting carrier waves which are angle modulated by either analog or digital signals; first selecting means for selecting either the analog or digital angle modulated carrier waves in response to a control signal; means for receiving both analog and digital angle modulated carrier waves and demodulating them to provide demodulated analog or digital signals, respectively;

means for regenerating a clock signal from the output of said receiving means;

analog-digital decision means responsive to said clock signals for generating said control signal, and second selecting means responsive to said control signal for selecting either said demodulated analog or digital signals.

4. A radio apparatus comprising:

receiver means for receiving both analog and digital angle-modulated carrier waves transmitted over a radio frequency;

means connected to the output of said receiver means for respectively demodulating said analog and digital angle-modulated carrier waves to provide first and second demodulated signals;

means for regenerating a clock signal from the output of said receiver means;

first switching means responsive to a control signal for selectively passing either said first or said second demodulated signals;

analog-digital decision means responsive to said clock signal for generating said control signal;

means for analog and digital modulating a signal to be transmitted to produce first and second modulated signals, respectively;

second switching means responsive to said control signal for selectively passing either said first or said second modulated signals; and means for transmitting the output of said second switching means over a radio frequency.

5. The radio apparatus of claims 3 or 4, wherein said analog-digital decision means comprises an amplifier for amplifying said clock signal, a rectifying circuit for rectifying the output of said amplifier, and a voltage comparator for comparing the output voltage of said rectifying circuit with a reference voltage to provide said control signal.

* * * * *